Figure 1:
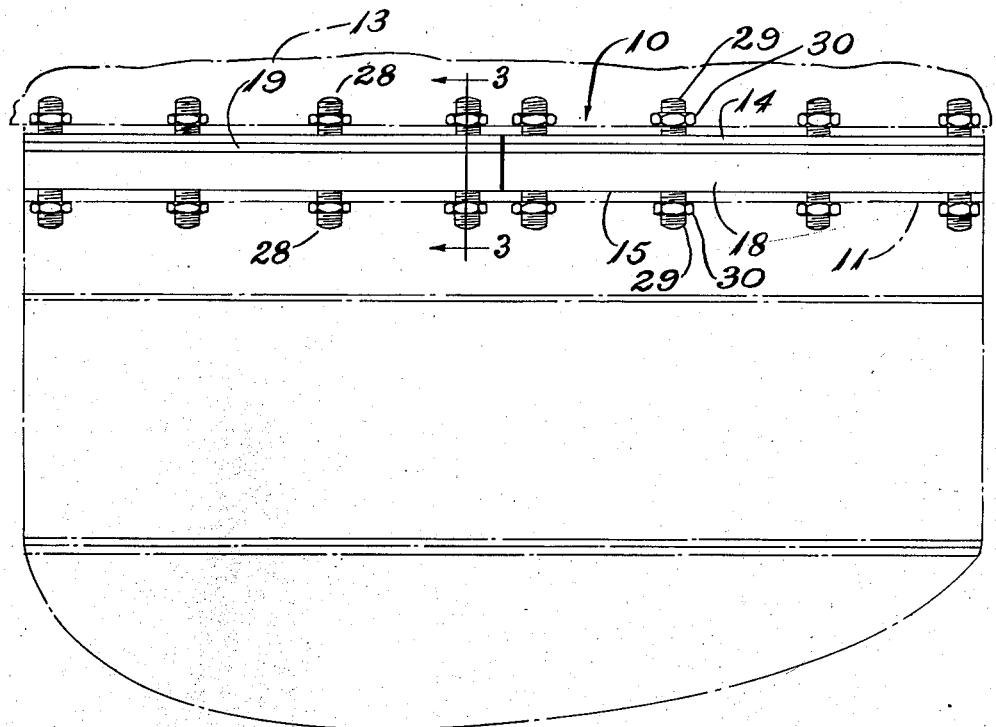

May 26, 1959  E. P. KROEGER  2,888,232
VIBRATION ISOLATION MOUNTING
Filed Jan. 4, 1955  2 Sheets-Sheet 1

INVENTOR.
EDWARD P. KROEGER
BY Dwight L. Moody
ATTY.

May 26, 1959 E. P. KROEGER 2,888,232
VIBRATION ISOLATION MOUNTING
Filed Jan. 4, 1955 2 Sheets-Sheet 2

INVENTOR.
EDWARD P. KROEGER
BY Dwight L. Moody
ATTY.

United States Patent Office 2,888,232
Patented May 26, 1959

2,888,232
VIBRATION ISOLATION MOUNTING

Edward P. Kroeger, Akron, Ohio, assignor to The B. F. Goodrich Company, New York, N.Y., a corporation of New York Application January 4, 1955, Serial No. 479,766

5 Claims. (Cl. 248—358)

The invention relates to yieldable mountings for joining adjacent spaced-apart bodies and for resisting the transmission of vibrations including audible and inaudible vibrations from one body to the other body, and relates especially to yieldable mountings for the housings or casings or domes which inclose underwater sound projector-receiver apparatus or transducers used to determine the bearing and/or range of an object within the transmitting and receiving range of the transducer.

Heretofore, the housings or casings or domes in which electrical sound projector-receiver transducers have been disposed for underwater sound navigation and ranging (Sonar) purposes, have generally been of streamline or other suitable shape to reduce water turbulence and cavitation, and generally have rigid walls of metal such as iron, steel, aluminum, bronze and the like, or walls of rubber composition with suitable stiff reinforcing structures therein, which walls are made as transparent to sound i.e. highly transmissive of sound, as possible. Such a housing has generally been attached to the hull of the ship by a rigid, inflexible mounting structure, and the attachment has provided a direct metal-to-metal contact and connection between the housing and the hull of the ship. This type of attachment is thought to permit objectionable telegraphing and transmission of ship's noises, sound vibrations or waves, audible and inaudible, to the housing, and permits the direct transmission of vibratory movements of the ship's hull to the housing.

An object of the invention is to provide means for overcoming the foregoing and other difficulties and disadvantages of the prior mountings for the underwater housings of Sonar apparatus or transducers.

Other objects of the invention are to provide for an improved vibration isolation mounting means for supporting a body; to provide for joining adjacent spaced-apart bodies in a yieldable manner to resist the transmission of vibrations and/or sounds from one body to the other body; to provide for accommodating while yieldably resisting relative lateral, angular and longitudinal movements of the joined bodies; to provide for stability of and cushioning by the mounting under static and dynamic loads thereon; to provide for resiliency of the mounting together with resistance to separation of spaced support elements of the mounting; and to provide for simplicity of construction convenience of manufacture and for effectiveness of operation.

More specific objects of the invention are to provide an improved resiliently yieldable mounting for a housing of underwater sound navigation and ranging apparatus; to provide for accommodation by the mounting of the hydrodynamic forces or stresses resulting from yaw, roll and pitch, or combinations thereof, of the ship or vessel upon which the housing is mounted; to provide for accommodating relative longitudinal movement of the housing and ship due to forward movement of the ship through the water, and for accommodating relative lateral or transverse movement of the housing and the ship due to yaw or to roll, or both, of the ship in the water; to provide for isolating the vibrations including audible and inaudible or supersonic sound vibrations and also the vibratory movements of the ship from the mounted housing; to provide for impedance of the mounting to extraneous sound waves by virtue of mismatch of the material's characteristics of the mounting, so as to prevent the extraneous sound waves from passing through the mounting to the wall of the housing; to provide for positively interlocking spaced-apart stiff support elements of the mounting; to provide for maximum elasticity of the mounting consistent with strength and stability of the mounting; to provide for a continuous peripheral seal of the mounting; to provide for a sectional annular structure of the mounting, especially a mounting having a streamlined contour in plan; and to provide for convenience of manufacture and assembly of the streamline-shaped annular mounting.

These and other objects and advantages will be apparent from the following description.

Figure 2:
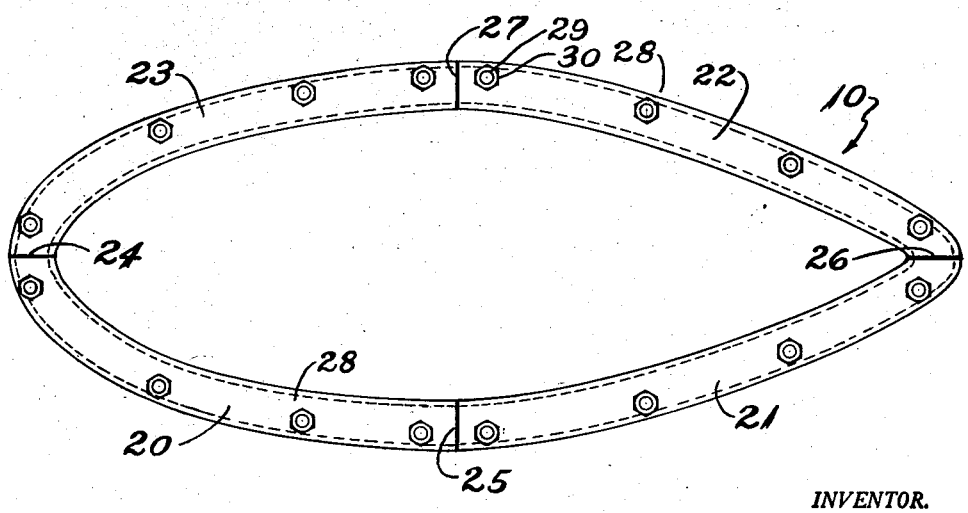
Figure 4:
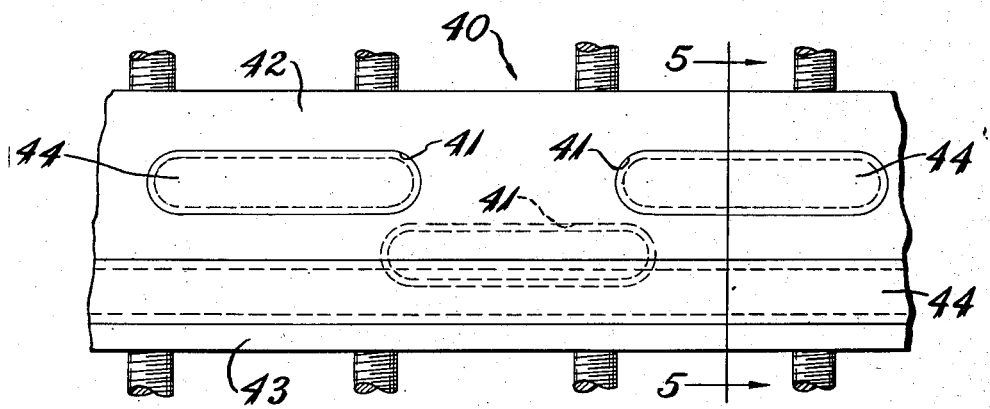
Figures 3, 5:
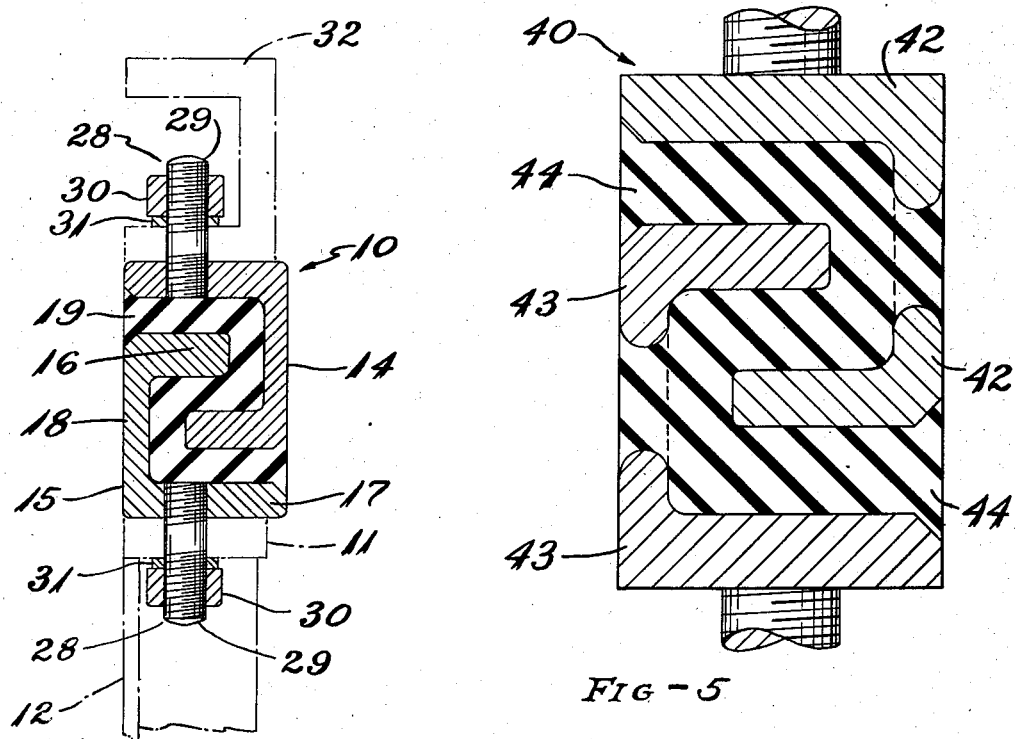

In the accompanying drawings which constitute a part of this specification and in which like numerals are employed to designate like parts throughout the same:

Fig. 1 is a side elevational view of a vibration isolation mounting between a transducer housing and the hull of a ship, and constructed in accordance with and embodying the invention, parts being broken away and shown in broken lines, Fig. 2 is a plan view showing the streamlined generally ring-like shape of the mounting, Fig. 3 is a sectional view taken along line 3—3 of Fig. 1, Fig. 4 is a side elevational view of a modified construction of the vibration isolation mounting, parts being broken away, and Fig. 5 is a sectional view taken along line 5—5 of Fig. 4.

The vibration isolation mounting 10 shown in Figs. 1 to 3, inclusive, has a continuous, annular or ring-like construction of streamlined shape or other suitable contoured shape in plan so as to conform to the shape or contour of the attaching margin 11 of the streamlined or other suitably shaped underwater sound transducer housing or casing 12 which is generally mounted on or attached to the bottom of the hull of a vessel 13 such, for example, as a surface ship or a submarine, for protecting electrical sound navigation and ranging equipment. The streamlined annular or ring-like mounting 10 has a rounded front or nose or bow portion merging with a tapering rear or tail or aft portion.

The mounting 10 includes annular upper and lower support members 14, 15 of stiff i.e. rigid material such, for example, as carbon steel, or stainless steel, or other strong metal resistant to salt water corrosion. Aluminum alloy or magnesium alloy may also be used, if the support members 14, 15 are specially treated to resist salt water corrosion. Each annular support member has an annular channel or recess in a side face thereof extending peripherally thereabout, so that the support member has preferably a channeled beam cross-section or a generally U-shaped cross-section as shown especially in Fig. 3. Desirably, one wall or flange 16 at a side of the channel in the support member, for example, the lower support member 15, is shorter than the opposite wall or flange 17 of the member 15 to accommodate interlocking both support members 14, 15 and accommodate sufficient thickness of resilient cushioning material between the end of the short wall 16 and the adjacent portion of the other or upper support member 14. The spaced-apart walls or portions or horizontal legs 16, 17 of the channeled lower support member 15 are interconnected by a side wall or web 18 extending vertically and across the bottom of the channel in the member 15. All the walls 16, 17 and 18 of the channeled support member may be of uniform thickness and are of sufficient thickness and strength to sustain without failure the stresses and loads to which the mounting 10 is subjected under service conditions. Also, the support members are of sufficient dimensions to provide the desired cushioned mounting 10.

The upper and lower support members 14, 15 extend peripherally along the mounting 10 in channel face-to-channel face relation and in spaced-apart superimposed interlocked relation one to the other with the relatively shortened upper wall 16 of the lower support member 15 disposed centrally in the channel in the upper support member 14 so as to overlap the upper and the shortened lower walls but terminate short of the adjacent vertical side wall of upper support member 14. The shortened lower wall of the upper support member is also disposed centrally in the channel in the lower support member 15 and terminates similarly short of the adjacent vertical side wall 18 of the lower support member, while similarly overlapping the walls 16, 17 of the lower support member 15. Thus, the continuous, annular, upper and lower support members 14, 15 are interlocked effectively against separation, especially in event of failure of the elastic cushioning material.

The channeled interlocked support members 14, 15 as shown in Fig. 3 are spaced-apart, vertically and horizontally of the mounting, relative to one another to provide, desirably, substantially uniform spacing between all adjacent opposed portions of the support members, whereby all the internal spaces within and bounded by the spaced interlocked support members are of substantially uniform width and extend continuously in a serpentine path from the outer peripheral side surface to the inner peripheral side surface of the mounting 10.

An annular cushioning means or body 19 consisting of elastic material such, for example, as resilient rubber, natural or synthetic, or other rubber-like material is disposed in the said spaces between the interlocked support members and entirely fills all such spaces and extends transversely continuous along a serpentine or generally S-shaped path from the outer peripheral side surface (at its upper region) to the inner peripheral side surface (at its lower region) of the mounting. A suitable resilient rubber composition for the intended purpose may have a 50 to 53 durometer hardness, and is capable of elastic deformation to absorb vibrations and resist their transmission through the body 19. The cushioning body 19 is preferably of substantially uniform thickness along the serpentine path and also peripherally of the mounting 10 to provide for uniformity of cushioning vertically, horizontally and peripherally of the mounting and provide for accommodation, by the mounting, of the hydrodynamic forces on the housing 12 resulting from yaw, pitch and roll of the vessel 13.

For convenience and low cost of manufacture of the mounting as by known rubber injection molding and vulcanizing apparatus and processes, the mounting is made desirably in sections 20, 21, 22 and 23 which are subsequently assembled and integrally united in end-to-end relation to provide the desired continuous, annular, contoured construction 10. To these ends the support members 14, 15 are each divided at a corresponding plurality of positions 24, 25, 26 and 27 spaced peripherally about the mounting, as shown in Figs. 1 and 2. In the case of the streamline-shaped mounting, two divisions 24, 26 are on the longitudinal axis of the mounting at its leading edge and its trailing edge regions, while the other two divisions 25, 27 are at the opposite sides and on the transverse axis of the mounting at its maximum width region. However, other positions of the divisions and a different number of sections may be utilized, if desired, especially for other contoured shapes of the mounting.

Each mounting section 20 to 23, inclusive, is individually made. The two channeled support members of a section are mounted and held in the desired position in a suitable longitudinally split mold (not shown) and then the rubber composition is suitably injected into the spaces between the support members in the mold so as to entirely fill all the spaces and form the cushioning body of the section, after which the rubber composition is suitably bonded to the support members and also vulcanized as by heat and pressure. The upper and lower halves of the split mold are then separated and the cured mounting section is removed from the mold. Preferably, the rubber composition of the cushioning body extends slightly beyond and entirely over or across the end faces of the metal support members at each end of the section, whereby metal-to-metal end contact of the upper and lower support members is entirely eliminated, when adjacent ends of adjacent sections are abutted and pressed forcibly together so that the narrow spaces between the adjacent metal end faces of the adjacent upper and lower support members of the respective adjacent sections are fully filled with the resilient rubber.

The mounting 10 can be fixedly attached to the vessel, or the housing, or both, as by welding the support members thereto; but the preferred attachment is of the detachable kind and for this purpose suitable separate attaching means 28, 28 are provided on the upper and lower support members for detachably engaging the vessel 13 and the housing 12. Desirably, the attaching means 28 comprises a plurality of peripherally spaced-apart, externally threaded elements or studs 29, 29 of suitable strong metal. The studs 29 threadedly engage and project from the exposed upper wall or attaching flange of the upper support member and the exposed lower wall or attaching flange of the lower support member. The studs 29 coact with suitable metal nuts 30 to detachably secure and bolt the mounting 10 to metal annular attaching margin 11 of the housing 12 and to the metal annular attaching structure 32 of the vessel 13, as shown in Figs. 1 to 3, inclusive. Each section 20, 21, 22 and 23 has a plurality of the peripherally spaced attaching studs 29, 29 on the respective upper and lower support members. The studs 29, 29 on a section, as shown in the drawings, are disposed in aligned pairs at the desired plurality of positions along the section to facilitate security of the attachment of the vibration isolation mounting 10.

The assembly and separable attachment of the sectional mounting 10 to the housing and the vessel may be accomplished in the following convenient manner. The four sections 20 to 23, inclusive, are individually disposed in peripheral series, end-to-end contacting relation one to the other with their lower support members seating firmly against the attaching margin 11 of the housing and with their lower studs 29, 29 extending downwardly through suitable apertures in the attaching margin and threadedly engaging the holding nuts 30, 30 under which may be placed suitable metal lock washers 31, 31. When the four sections of the streamlined mounting are thus assembled upon the housing, the adjacent ends of the elastic cushioning bodies 19 and the adjacent rubber covered end faces of the metal support members 14, 15 of adjacent sections are maintained tightly and resiliently pressed together. This avoids completely any metal-to-metal contact of the support members at the junctures of the sections, and integrally unites the sections of the mounting to provide the unitary mounting structure 10. The housing 12 and the attached unitary mounting structure 10 are lifted until the annular upper support member 14 of the mounting seats firmly against the annular attaching structure 32 of the vessel, and the upper attaching studs 29, 29 extend upwardly through suitable apertures in the vessel attaching structure and are in threaded engagement with the holding nuts 30, 30 overlying lock washers 31, 31.

This provides a separable, bolted type, cushioned attachment of the housing 12 to the vessel 13 advantageously avoiding any direct metal-to-metal contact of the housing against the hull of the vessel. The mounting 10 accommodates limited relative longitudinal movement of the housing and the vessel due to forward movement of the vessel, and also accommodates limited relative lateral or transverse movement of the housing and the vessel due to yawing or rolling of the vessel. The mounting is capable of withstanding the hydrodynamic forces transmitted by the housing to the mounting and resulting from yaw, pitch and roll of the vessel.

The mounting 10 absorbs transmitted vibrations of the vessel by virtue of the elastic deformation of the cushioning body; hence the mounting does not transmit such undesirable vibrations to the housing where they interfere with the desired functioning of the electrical sound transducer. A further advantage of the mounting 10 is due to the mismatch in characteristics of the rubber composition of the cushioning body and of the metal support members, whereby the mounting functions as an impedance effectively resisting the entrance of objectionable extraneous sounds into the housing 12.

The features of spacing, superimposing and interlocking the channeled support members of the annular streamlined mounting 10 effectively prevents loss of the housing, while making feasible an elastically cushioned isolation of the housing from the vessel and its vibrations, thereby improving the functioning of the transducer within the housing.

The modified construction 40 shown in Figs. 4 and 5 differs from the construction of the mounting 10 in that elongated apertures or openings or slots 41, 41 are provided in the side walls of the channeled upper and lower support members 42, 43 at peripherally spaced-apart positions therein. The rubber composition material of the cushioning body 44 extends through and entirely fills each of the spaces of the elongated apertures 41, 41 and is bonded to the adjacent surfaces of the support member. This modified construction has provision of increased yieldability and reduced stiffness as compared to the mounting 10, and is suitable for those applications requiring such characteristics of the mounting.

Variations may be made without departing from the scope of the invention as it is defined in the following claims.

I claim:

1. A vibration isolation mounting for attaching and sealing adjacent spaced superimposed bodies one to the other, said vibration isolation mounting having an approximately annular form and comprising a pair of elongated rigid support members extending peripherally about the annular mounting each including a web portion and two spaced flange portions radially projecting from the same side of the web portion defining a channel between said flange portions, said support members being disposed with said channels facing toward one another so that said web portions are located in the outer and inner peripheries of the mounting and with all said radially projecting flange portions in spaced-apart superimposed interlocked reltaion with one of said flange portions of each member disposed in the channel of the other member and radially spaced from the web portion of said other member, cushioning means extending peripherally about the annular mounting and consisting of elastic material entirely filling all spaces within the support members and bonded to the flange portions and web portions thereof, and means for fastening the exposed flange portion of each said support member to one of the said adjacent spaced superimposed bodies at a plurality of positions spaced-apart along the member.

2. A vibration isolation mounting as defined in claim 1 in which said elongated rigid support members are divided at corresponding positions peripherally spaced-apart, thereby providing a plurality of pairs of support members extending peripherally in end-to-end relationship with adjacent ends of adjacent pairs of support members in closely spaced relation to one another, and in which said cushioning means is divided at said positions but entirely fills all spaces between said adjacent ends of adjacent pairs of support members and is bonded to said adjacent ends and extends to said outer and inner peripheries of the mounting, and the said fastening means comprises at least a pair of peripherally spaced fastener elements united with the said exposed flange portion of each support member in each of said pairs of support members.

3. A vibration isolation mounting as defined in claim 1 in which each of said elongated rigid support members has peripherally-extending elongated apertures in its web portion at peripherally spaced positions therein, and said cushioning means extends entirely fills said apertures and is bonded to the walls thereof.

4. A vibration isolation mounting for attaching and sealing an underwater sound transducer housing to the bottom of the hull of a vessel, said mounting having an approximately annular form with a rounded front portion merging with a tapered rear portion, said mounting comprising elongated rigid upper and lower support members extending peripherally about the annular mounting each including a web portion and an upper and a lower flange portion radially projecting in parallel spaced relationship from the same side of the web portion defining a channel between said flange portions, said upper flange portion of the upper support member projecting radially beyond the lower flange portion thereof, said lower flange portion of the lower support member projecting radially beyond the upper flange portion thereof, said support members being disposed with said channels facing toward one another so that said web portions are located in the outer and inner peripheries of the mounting and with all said radially projecting flange portions in uniformly spaced-apart superimposed interlocked relation, the lower flange portion of said upper support member being disposed in the channel of the lower support member and radially spaced from the web portion of said lower support member and the upper flange portion of said lower support member being disposed in the channel of the upper support member and radially spaced from the web portion of said upper support member, cushioning means extending peripherally about the annular mounting and consisting of resilient rubbery material entirely filling all spaces within the support members and bonded to the flange portions and web portions thereof, means for fastening the upper flange portion of said upper support member to the hull of said vessel at a plurality of positions spaced-apart along such member, and means for fastening the lower flange portion of said lower support member to the said transducer housing at a plurality of positions spaced-apart along said lower support member.

5. A vibration isolation mounting as defined in claim 4 in which said elongated rigid upper and lower support members are divided at corresponding positions peripherally spaced-apart, thereby providing a plurality of pairs of upper and lower support members extending peripherally in end-to-end relationship with adjacent ends of adjacent pairs of said support members in closely spaced relation to one another, and in which said cushioning means is divided at said positions but entirely fills all spaces between said adjacent ends of adjacent pairs of said support members and is bonded to said adjacent ends and extends to said outer and inner peripheries of the mounting.

References Cited in the file of this patent
UNITED STATES PATENTS

| | | |
|---|---|---|
| 1,435,258 | Roberts | Nov. 14, 1922 |
| 1,720,545 | Dickey | July 9, 1929 |
| 1,980,448 | Stoddard | Nov. 13, 1934 |
| 2,377,006 | Heinemann et al. | May 29, 1945 |

FOREIGN PATENTS

| | | |
|---|---|---|
| 535,332 | Great Britain | Apr. 7, 1941 |